(12) United States Patent
Khan et al.

(10) Patent No.: US 10,946,618 B2
(45) Date of Patent: Mar. 16, 2021

(54) PROCESS FOR MAKING 7XXX SERIES ALUMINUM/FIBER REINFORCED POLYPROPYLENE HYBRID PART FOR AUTOMOTIVE CRASH ABSORPTION APPLICATION

(71) Applicant: AISIN TECHNICAL CENTER OF AMERICA, INC., Northville, MI (US)

(72) Inventors: Saida Khan, Canton, MI (US); Santosh Sarang, Novi, MI (US); Ichiro Hiratsuka, Novi, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 233 days.

(21) Appl. No.: 16/133,457

(22) Filed: Sep. 17, 2018

(65) Prior Publication Data

US 2020/0086609 A1    Mar. 19, 2020

(51) Int. Cl.
*B29C 65/36*    (2006.01)
*B29C 65/44*    (2006.01)
(Continued)

(52) U.S. Cl.
CPC ........ *B32B 15/085* (2013.01); *B29C 65/3612* (2013.01); *B29C 65/3656* (2013.01);
(Continued)

(58) Field of Classification Search
CPC ............ B29C 65/3404; B29C 65/3408; B29C 65/3412; B29C 65/3456; B29C 65/3476;
(Continued)

(56) References Cited

U.S. PATENT DOCUMENTS 3,850,763 A * 11/1974 Zinnbauer ............... B23P 15/00
                                                      205/206
3,945,861 A *  3/1976 Anderson ............... C22F 1/053
                                                      148/690
(Continued)

FOREIGN PATENT DOCUMENTS

DE            3818478 A1    12/1989

*Primary Examiner* — Michael A Tolin
(74) *Attorney, Agent, or Firm* — Oblon, McClelland, Maier & Neustadt, L.L.P.

(57) ABSTRACT

A method to prepare a composite laminate object containing an extrusion grade 7xxx Al substrate and a fiber-reinforced polypropylene layer adhesively laminated to the substrate; is provided. The process includes shaping and cutting an extruded 7xxx aluminum to a profile, assembling a layered arrangement of the 7xxx Al profile as substrate, an adhesive film and a fiber reinforced polypropylene preform, heating the layered arrangement to a temperature of 160-175° C. to melt the polypropylene and activate the adhesive film, applying pressure to at least a surface of the fiber reinforced polypropylene preform to mold the preform to the shape of the extruded 7xxxAl substrate and obtain a semi-finished laminate object, cooling the semi-finished laminate object to 90° C., optionally, cooling the semi-finished laminate object to room temperature for inventory storage; heat treating the semi-finished laminate object at 90° C. for 2 to 8 hours; and then heat treating the semi-finished laminate object at 130° C. to 150° C. for 8 to 16 hours; and cooling the heat treated object to obtain the composite laminate object.

14 Claims, 1 Drawing Sheet

(51) Int. Cl.

| | |
|---|---|
| B29C 65/50 | (2006.01) |
| B29C 70/42 | (2006.01) |
| B29C 70/78 | (2006.01) |
| B29L 31/30 | (2006.01) |
| B32B 15/085 | (2006.01) |
| B32B 15/20 | (2006.01) |
| B32B 37/08 | (2006.01) |
| B32B 37/10 | (2006.01) |
| B32B 7/12 | (2006.01) |
| B60R 19/03 | (2006.01) |
| B32B 27/32 | (2006.01) |
| B32B 27/18 | (2006.01) |
| B32B 37/04 | (2006.01) |
| B32B 1/08 | (2006.01) |
| B32B 38/00 | (2006.01) |
| B29C 65/48 | (2006.01) |
| B29C 70/44 | (2006.01) |
| C22F 1/053 | (2006.01) |
| B32B 37/12 | (2006.01) |
| B60R 19/18 | (2006.01) |

(52) U.S. Cl.
CPC ...... B29C 65/3676 (2013.01); B29C 65/3684 (2013.01); B29C 65/44 (2013.01); B29C 65/489 (2013.01); B29C 65/4815 (2013.01); B29C 65/4835 (2013.01); B29C 65/4885 (2013.01); B29C 65/5057 (2013.01); B29C 70/42 (2013.01); B29C 70/446 (2013.01); B29C 70/78 (2013.01); B32B 1/08 (2013.01); B32B 7/12 (2013.01); B32B 15/20 (2013.01); B32B 27/18 (2013.01); B32B 27/32 (2013.01); B32B 37/04 (2013.01); B32B 37/10 (2013.01); B32B 38/0004 (2013.01); B32B 38/0036 (2013.01); B60R 19/03 (2013.01); C22F 1/053 (2013.01); *B29L 2031/3044* (2013.01); *B32B 37/08* (2013.01); *B32B 2037/1253* (2013.01); *B32B 2262/101* (2013.01); *B32B 2262/106* (2013.01); *B32B 2305/07* (2013.01); *B32B 2305/30* (2013.01); *B32B 2307/558* (2013.01); *B32B 2309/02* (2013.01); *B32B 2309/12* (2013.01); *B32B 2311/24* (2013.01); *B32B 2323/10* (2013.01); *B32B 2363/00* (2013.01); *B32B 2597/00* (2013.01); *B32B 2605/08* (2013.01); *B60R 2019/182* (2013.01); *B60R 2019/1853* (2013.01)

(58) Field of Classification Search
CPC . B29C 65/3492; B29C 65/36; B29C 65/3604; B29C 65/3608; B29C 65/3612; B29C 65/3656; B29C 65/3676; B29C 65/3684; B29C 65/44; B29C 65/46; B29C 65/4815; B29C 65/4835; B29C 65/486; B29C 65/4885; B29C 65/489; B29C 65/50; B29C 65/5057; B29C 70/20; B29C 70/202; B29C 70/205; B29C 70/207; B29C 70/22; B29C 70/222; B29C 70/30; B29C 70/34; B29C 70/342; B29C 70/40; B29C 70/42; B29C 70/44; B29C 70/446; B29C 70/68; B29C 70/681; B29C 70/682; B29C 70/78; B29K 2023/10; B29K 2023/12; B29K 2023/14; B29L 2031/003; B29L 2031/3044; B32B 1/08; B32B 7/12; B32B 15/085; B32B 15/20; B32B 27/18; B32B 27/20; B32B 27/32; B32B 37/04; B32B 37/08; B32B 37/10; B32B 37/1207; B32B 2037/1223; B32B 2037/1253; B32B 38/0004; B32B 38/0036; B32B 2262/101; B32B 2262/106; B32B 2305/07; B32B 2305/10; B32B 2305/22; B32B 2305/30; B32B 2307/558; B32B 2309/02; B32B 2309/12; B32B 2311/24; B32B 2323/10; B32B 2363/00; B32B 2597/00; B32B 2605/08; B60R 19/03; B60R 19/18; B60R 2019/1806; B60R 2019/1813; B60R 2019/182; B60R 2019/1833; B60R 2019/1853; C22F 1/053
See application file for complete search history.

(56) References Cited

U.S. PATENT DOCUMENTS

| | | |
|---|---|---|
| 8,845,910 B2 | 9/2014 | Naritomi et al. |
| 9,079,385 B2 | 7/2015 | Miura et al. |
| 2013/0071631 A1 | 3/2013 | Chao |
| 2016/0159300 A1 | 6/2016 | Matecki et al. |
| 2016/0265570 A1 | 9/2016 | Sabau et al. |
| 2017/0066949 A1 | 3/2017 | Imai et al. |
| 2017/0088753 A1 | 3/2017 | Nakamura et al. |
| 2017/0113255 A1 | 4/2017 | Takeuchi |
| 2018/0112298 A1* | 4/2018 | Weykamp ............... B21B 3/00 |
| 2018/0250915 A1* | 9/2018 | Wu ............ B32B 27/308 |
| 2019/0100252 A1* | 4/2019 | Boettcher ............ B29C 70/78 |

\* cited by examiner

PROCESS FOR MAKING 7XXX SERIES ALUMINUM/FIBER REINFORCED POLYPROPYLENE HYBRID PART FOR AUTOMOTIVE CRASH ABSORPTION APPLICATION

FIELD OF THE INVENTION

This invention relates to a method for optimized and economical production of laminates of 7xxx series aluminum alloys and fiber reinforced polypropylene suitable for automotive parts requiring energy absorption utility.

DESCRIPTION OF THE BACKGROUND

Due to environmental regulations and in order to obtain high gas mileage performance, the automotive industry continues to explore methods to manufacture vehicles having significant weight reduction (light-weighting). Aluminum and fiber reinforced plastic composites offer an opportunity as two highly promising lightweight materials to replace heavy weight steel parts. Of the commercial aluminum grades, 7xxx aluminum alloys, being the alloy grade offering the highest strength, are conventionally employed in the aircraft and aerospace industries but are relatively new in automotive applications. Aluminum alloys of the 7xxx grade may have yield strengths greater than 500 MPa. Because of their high strength to weight benefit they have been extensively used in aerospace applications.

More recently the automotive industry has become interested in the utilization of 7xxx series aluminum extrusion grade alloys to meet the increasing demand for vehicle light-weighting.

The use of fiber reinforced plastics (FRP) offers another avenue of weight reduction that is becoming popular in automotive manufacture. Further potential methods to design and manufacture efficient and lightweight vehicle parts are to combine advantages of Aluminum and FRP by making composite Al-FRP hybrid parts. Such hybrids are of great interest to the automotive industry because of their excellent mechanical properties and weight reduction potential. Adhesive bonding is a preferred lamination technique for manufacturing fiber reinforced composite metal hybrids in order to stiffen the aluminum with lightweight FRP especially for the manufacture of energy absorbing automotive parts.

Extrusion grade aluminum alloys of the 7xxx series may be cast from a molten phase, homogenized and then extruded to produce parts of desired shape such as tubes and angled beams useful for producing bumper components. The parts produced in this way are generally subjected to a cooling and ageing regimen and then cut and shaped to a profile component. However, during the solidification of the cast alloy, homogenation, extrusion and shaping multiple events are taking place within the microstructure. Firstly, the metal phase is nucleating in grains which may be cellular, dendritic or a combination thereof. Further, where non-equilibrium solidification conditions exist alloy components may be rejected from the forming grains and are concentrated in pockets in the microstructure, thus also adversely affecting the performance properties of the product. The result of these events is compositional variances across not only the grain but also in the regions adjacent to the intermetallic phases where relatively soft and hard regions co-exist in the structure and, if not modified or transformed, will create property variances unacceptable to the final 7xxx aluminum alloy product. Thus, the product is conventionally subjected to an ageing heat treatment in order to ensure the final part is of maximum strength and impact toughness. As a result of the final ageing and heat treatment grain distribution of the alloy becomes more uniform. Further, low melting point constituent particles that may have formed may be dissolved back into the grains.

However, during the process of producing hybrid metal laminates the thermal history of the 7xxx aluminum alloy is further affected and any lamination process must include consideration of the alloy grain structure and the effects of the thermal processing on the grain structure. Thus in the lamination process the FRP in the form of a mat pre-peg may be adhesively bonded to the 7xxx aluminum alloy under heating and applied pressure. Once the lamination process is completed further ageing treatment is necessary to assure the aluminum alloy provides maximized performance properties as the metal FRP hybrid laminate.

Thus, there is a need to minimize and/or consolidate the number of operations requiring ageing and heat treatment as well as to identify the optimum temperature and time profile under which to conduct the entire process to produce hybrid aluminum 7xxx alloy FRP parts.

Thus an object of the present invention is to provide a method to produce hybrid aluminum 7xxx alloy FRP laminate composite structures which is optimized for efficiency and provides composite structures of high strength and impact resistance.

Another object of the present invention is to provide a method to produce hybrid aluminum 7xxx alloy polypropylene FRP laminate composite structures which is optimized for efficiency and provides composite structures of high strength and impact resistance.

SUMMARY OF THE INVENTION

These and other objects are provided by the present invention the first embodiment of which includes a method to prepare a composite laminate object, the object comprising: an extruded 7xxx Al substrate; and a fiber-reinforced polypropylene layer adhesively laminated to the substrate; wherein the composite laminate object is obtained by a process comprising:

shaping and cutting a 7xxx aluminum extruded structure to a profile;

assembling a layered arrangement of the 7xxx Al profile as substrate, an adhesive film and a fiber reinforced polypropylene preform;

heating the layered arrangement to a temperature of 160-175° C. to melt the polypropylene and activate the adhesive film;

applying pressure to at least a surface of the fiber reinforced polypropylene preform to mold the perform to the shape of the extruded 7xxxAl substrate and obtain a semi-finished laminate object;

cooling the semi-finished laminate object to 90° C., optionally, cooling the semi-finished laminate object to room temperature (20 to 30° C.) for inventory storage;

heat treating the semi-finished laminate object at 90° C. for 2 to 8 hours;

then heat treating the semi-finished laminate object at 130° C. to 150° C. for 8 to 16 hours; and cooling the heat treated object to obtain the composite laminate object.

The forgoing description is intended to provide a general introduction and summary of the present invention and is not intended to be limiting in its disclosure unless otherwise explicitly stated. The presently preferred embodiments, together with further advantages, will be best understood by reference to the following detailed description taken in conjunction with the accompanying drawings.

DETAILED DESCRIPTION OF THE PREFERRED EMBODIMENTS

Figure 1:
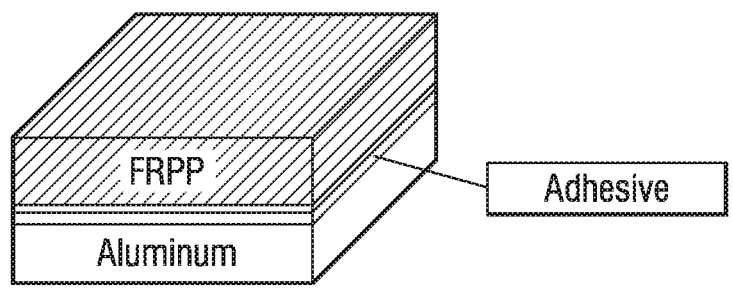
FIG. 1 shows a schematic diagram of a flat laminate structure according to one embodiment of the invention.

In the following description the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted. All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

Hybrid bumper beams for vehicular use are described in U.S. application Ser. No. 15/475,964, filed Mar. 31, 2017, the disclosure of which is incorporated herein by reference. The bumper beam includes a bumper beam body having a tubular portion extending in a vehicle width direction, the bumper beam having a metal section and a composite section, wherein the metal section and the composite section are coaxial, the composite portion being along an inner surface of the metal section.

The bumper beam according to the present embodiments includes a metal section of extruded 7xxx aluminum and one or more composite sections of fiber reinforced polypropylene generally referred to as "composite" in this description. The metal section may be formed into any appropriate shape and the composite is then molded to that shape in order to form a hybrid 7xxx aluminum composite of high strength and light weight. The bonding of the composite to the 7xxx aluminum must be secure and free of void spaces between the aluminum alloy surface and composite in the final product.

The 7xxx aluminum section may have a thickness of from 2 mm to 5 mm, preferably from 2 mm to 3 mm and most preferably from 2 mm to 2.5 mm. Reduction in weight is sought by reducing the thickness of the aluminum and the use of 7xxx aluminum allows the production of high strength hybrid composites employing the 7xxx aluminum in a thickness as thin as 2 mm.

The composite portion of the hybrid may be formed of one or more layers of mat in the form of prepreg, comingled fiber, unidirectional (UD) tapes, organo-sheet, fabric and any other form of resin impregnated continuous fiber material. The composites may be preformed to a shape compatible with the profile of the extruded 7xxx aluminum or may be compressed to the profile shape during the molding lamination process. One layer of the composite may be approximately 0.8 mm in thickness and the number of composite layers applied and laminated in the hybrid structure may vary from 1 to 4 layers or more depending on the structure and design of the final 7xxx hybrid composite product.

As indicated above, the 7xxx aluminum may be extruded and shaped to any appropriate profile and conventionally following the shaping operation, the profile is heat treated and aged to assure the 7xxx aluminum retains the highest strength. Then the lamination of the composite is conducted and following that operation, the metal hybrid composite would be heat treated and aged once more. Conventionally, anytime the 7xxx Al is subjected to an operation conducted at an elevated temp greater than 100° C. it will be heat treated and aged to assure maximum strength and impact toughness.

The inventors have conducted studies of a process to produce composite 7xxx aluminum alloys and fiber reinforced plastic laminates to define a process employing a minimum number of operations and the optimum temperature range for simultaneous heat treatment of the 7xxx series aluminum, consolidation of the polypropylene fiber reinforced composite laminate and adhesive bonding between aluminum and composite while ensuring the final hybrid part retains maximum strength and impact toughness.

Polypropylene is selected as the FRP plastic due to its relatively low melting point (165° C.) and therefore, the composite may be molded and formed to the 7xxx profile with minimal heat effect to the 7xxx grain structure.

Thus, the first embodiment of the present disclosure provides a method to prepare a composite laminate object, the object comprising: an extruded 7xxx Al substrate; and a fiber-reinforced polypropylene layer adhesively laminated to the substrate; wherein the composite laminate object is obtained by a process comprising:

shaping and cutting an extruded 7xxx aluminum structure to a profile;

assembling a layered arrangement of the 7xxx Al profile as substrate, an adhesive film and a fiber reinforced polypropylene preform;

heating the layered arrangement to a temperature of 160-175° C. to melt the polypropylene and activate the adhesive film;

applying pressure to at least a surface of the fiber reinforced polypropylene preform to mold the perform to the shape of the extruded 7xxxAl substrate and obtain a semi-finished laminate object;

cooling the semi-finished laminate object to 90° C., optionally, cooling the semi-finished laminate object to room temperature (20 to 30° C.) for inventory storage;

heat treating the semi-finished laminate object at 90° C. for 2 to 8 hours;

then heat treating the semi-finished laminate object at 130° C. to 150° C. for 8 to 16 hours; and cooling the heat treated object to obtain the composite laminate object.

Figure 2:
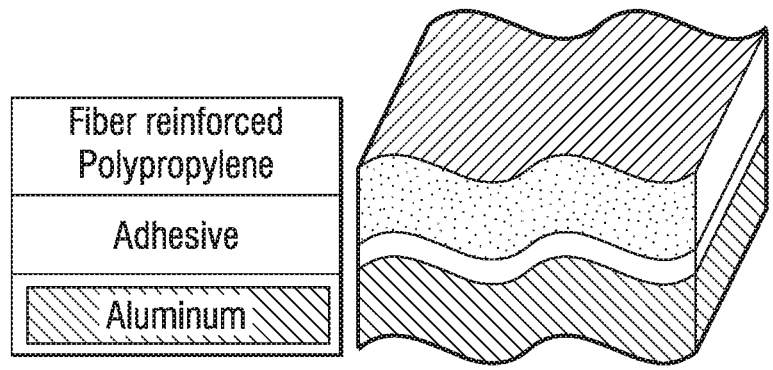
FIG. 2 shows a schematic diagram of a laminate having a corrugated shape according to an embodiment of the invention.
Figure 3:
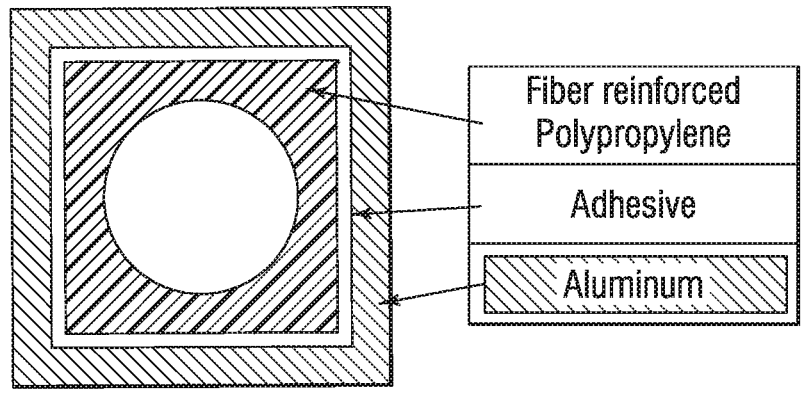
FIG. 3 shows a schematic diagram of a tubular laminate structure according to an embodiment of the invention.

The 7xxx profile may be of any appropriate shape consistent with the design of the final shock absorbent part and may be of a form such as, but not limited to a C form sheet, a corrugated sheet and a tube. A schematic diagram of a corrugated sheet structure is shown in FIG. 2 and a schematic diagram of a tubular structure is shown in FIG. 3.

The thickness of the 7xxx aluminum may be from 2 mm to 3 mm

In one preferred embodiment the 7xxx aluminum profile is extruded in a tubular form, cooled, aged, then cut to length and shaped as necessary.

The composite of the fiber reinforced polypropylene is provided as a preform unit or a pre-peg component. Generally in the construction of such tubular parts the composite is placed inside the 7xxx aluminum tube to prevent galvanic corrosion due to water and moisture exposure. In addition, placing the composite inside of the tube prevents scattering debris from a shattered composite section in case of a collision or crash.

To prepare the tubular laminate structure the composite preform or pre-peg if the mat is impregnated with polypropylene may be wrapped around an inflatable mandrel using one or more plies of fiber mat laid up into specific orientation to create the required thickness of the composite. A layer of adhesive may be applied to the surface of the pre-form or pre-peg to face the inner surface of the aluminum profile. The mandrel so wrapped with composite as preform with polypropylene sheet or pre-preg is inserted into the 7xxx aluminum profile. Then, the entire assembly is heated by induction, conduction or convection up to the point so the polypropylene melts (160-175° C.) and impregnates the fibers completely. At the same time, the mandrel may be inflated at room temperature or using heated gas, heated oil, or heated water to a pressure of from 50 to 200 psi to press the outer adhesive containing surface of the composite against the inner surface of the 7xxx aluminum profile and to conform the composite to the shape of the profile and eliminate the formation of voids between the composite and the inner surface of the 7xxx aluminum.

If the 7xxx Al profile is not tubular but has another shape which is irregular or corrugated or includes multiple cavities the preform may be compression molded to the profile with a mold adapted to the actual shape and the temperature raised to melt the polypropylene as described above. The pressure of the compression mold may be from 50 to 200 psi to tightly adhere the composite to the 7xxx Al substrate surface and eliminate any void spaces between the composite and the aluminum alloy.

The adhesive employed may be any known in the art to be effective in the temperature range applied according to the present disclosure and may be any of a thermoplastic film, a hotmelt resin and a thermoset film of a 1K paste. 1K thermostet epoxy resin systems may be favored as adhesives due to their relatively low application and curing temperatures.

A layer of composite is approximately 0.8 mm in thickness and from 1-4 composite layers may be applied in the laminate structure. Thus in consideration of the thickness of the 7xxx aluminum previously described, the total thickness of the laminate structure may be from 2.8 mm to 6.2 mm, preferably from 2.8 mm to 4.4 mm.

In certain embodiments, the composite may be non-continuous and the thickness of the composite may be changed locally. Additional layers of pre-peg may be used to create a variable thickness at one or more portions of the structure to increase the strength at one or more portions as may be useful in a bumper beam. For example, a center portion of a bumper beam may be made thicker and stronger with more fiber reinforcement (i.e., more plies are laid up at the center portion of the bumper beam compared to end sections of the bumper beam) for center pole crash requirements. Similarly, inside corners may also be reinforced using more fibers in corners of the beam.

No matter the shape or form of the structure being produced pressure is applied at the time of melting the polypropylene to conform the composite exactly to the 7xxx Al substrate surface and laminate the composite directly to the aluminum surface via bonding of the adhesive layer.

Following the molding operation, the unit may be cooled to 85 to 95° C., preferably 90° C. and maintained at that temperature for from 2 to 8 hours, preferably 2 to 6 hours and most preferably from 2 to 4 hours. Cooling may be achieved by transferring the metal hybrid unit to cooling unit cooled by convection or by cooling coils supplied with coolant. During this cooling cycle the polypropylene solidifies and consolidates the composite structure and the adhesive cures, thus forming the composite 7xxx aluminum bond.

Optionally, once cooled to 90° C., the semi-finished laminate object may be further cooled to room temperature (20 to 30° C.) and stored as an inventory item until product demand requires the object to be completed as a finished product by the further heat treatments described in the method. Having a point in the operations of the method for inventory storage may be advantageous in a production environment where stock may be appropriately inventoried and finished when required. At the time of the requirement, the semi-finished laminate object may be reheated to 90° C. and the heat treatment operations of the method continued.

Once the composite is consolidated and the adhesive bond cured the hybrid part may be heat treated and further aged to assure the 7xxx aluminum has maximum strength and impact toughness. Thus the unit is heated to 130° C. to 150° C. for 8 to 16 hours.

The reinforcing fibers may be glass, carbon, aramid or a combination thereof. The fibers may be partially or completely impregnated with the polypropylene resin.

The polypropylene may be chemically modified to include silane, acid or anhydride functionality which may enhance bonding of the composite to the 7xxx aluminum and/or improve the interlaminar strength of the composite hybrid. Examples of chemical modifying agents include but are not limited to maleic anhydride, methacrylic acid, acrylic acid, halosilanes and alkoxy silanes.

Further, additives such as graphite or metal particles may be added to the polypropylene to facilitate uniform and rapid heating throughout the composite structure.

Additionally, in one embodiment oils conventionally added to polypropylene resin as a mold release agent may be eliminated, especially when the 7xxx aluminum profile is tubular in shape and in fact serves both as metal component of the hybrid part and the mold for the composite. The absence of such agents including silicone oils, waxes and hydrocarbon oils may further enhance the strength performance of the 7xxx hybrid composite part.

Advantageously the use of the mat preform or prepeg composite as described above provides a method wherein the fiber angles of the reinforcing fibers may be controlled. Such control is important to maintain the fibers in proper angles since the impact performance depends on the correct defined angles. For example, the fibers can be placed at 0, 30, 45, 60, 90 degree or any other angle as a function of crash requirements. Once the mat is consolidated the angles are maintained.

The laminate parts produced according to the embodiments of this disclosure may be automotive parts having high strength and energy absorption performance such as bumper units.

The method described in this disclosure provides lightweight extruded 7xxx aluminum composite hybrid parts having maximized strength and impact performance consistent with 7xxx aluminum alloys using a production process which is efficient and energy cost effective. The method is simple and cost effective and may be applied to both closed parts such as tubular profiles or open sections such as bumper beams. Because the thickness of the extruded 7xxx aluminum profile is constant, variation of the thickness of different sections of the hybrid part is obtained by applying multiple plies of fiber mat. The method requires polypropylene as the consolidating resin due to the low melting point of polypropylene in comparison to other resins often employed in manufacture of impact absorbing parts such as nylon 6 (PA6), polymethylpentene (PMP), polybutylene terephthalate (PBT) and polyethylene terephthalate (PET). Polypropylene and 7xxx aluminum are both recyclable which is advantageous from an environmental and cost effectiveness standpoint.

EXAMPLES

Example 1

Flat coupons of the structure shown in FIG. 1 were assembled using a commercially available thermoplastic epoxy adhesive. Each coupon was laminated at the temperature as indicated in the following Table and tested according to 3 point bend test according to ISO 178. The results are shown in the Table

| | Effect on materials | | | |
|---|---|---|---|---|
| Temperature, C. | PP | Adhesive | Aluminum | Hybrid part |
| 145 | Insufficient bonding between layers | NG curing | OK | Not acceptable |
| 160 | Good consolidation of laminate | Sufficient Curing | OK | Good |
| 175 | Good consolidation of laminate | Sufficient Curing | OK | Good |
| 190 | Good consolidation of laminate | Sufficient Curing | Degradation | Reduced strength* |

*3 point bend test according to ISO 178.

Example 2

Testing comparing the performance of a bumper beam with PP composite insert with an aluminum reference was performed. An Aisin Aluminum 7XXX series grade 7T04 tube was cut to an appropriate test piece size from an extruded bumper beam. PP resin impregnated glass fiber roving (i.e., Glass fiber reinforced plastic (GFRP)) was used to create a closed tubular shape using a unidirectional automatic tow placement process. A film adhesive was used as the outer layer of the preform. Then, an inflatable resin mandrel was inserted into the composite perform and both inserted into the Aluminum tube. The mandrel was connected to gas inlets on both ends. While heating the Aluminum surface to above melting point of PP (165 C), the mandrel was inflated to bring the outer radius surface of composite section in complete contact with the inner radius surface of metal part. The gas pressure was programmed between 50 to 200 psi. The entire assembly was kept over 170 C for a period of time to ensure the resin was melted and provided enough time for complete impregnation by the resin. The tubes were tested for three points flexural load and showed significant (up to 48%) improvement in peak load when compared with Aluminum reference tube.

Additional advantages and other features of the present invention will be set forth in part in the description that follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. In this regard, the description herein is to be understood as illustrative in nature, and not as restrictive.

The invention claimed is:

1. A method of making a composite laminate object, the composite laminate object comprising an extrusion grade 7xxx Al substrate and a fiber reinforced polypropylene layer adhesively laminated to the 7xxx Al substrate, the method comprising:
   shaping and cutting an extruded 7xxx aluminum member to form a 7xxx Al substrate having a shape;
   assembling a layered arrangement of the 7xxx Al substrate, an adhesive film and a fiber reinforced polypropylene preform, wherein the fiber reinforced polypropylene preform comprises reinforcing fibers and polypropylene resin;
   heating the layered arrangement to a temperature of 160° C. to 175° C. to melt the polypropylene resin and activate the adhesive film;
   applying pressure to at least a surface of the fiber reinforced polypropylene preform to mold the fiber reinforced polypropylene preform to the shape of the 7xxx Al substrate and obtain a semi-finished laminate object;
   cooling the semi-finished laminate object to 90° C.;
   optionally, cooling the semi-finished laminate object to 20° C. to 30° C. for inventory storage;
   heat treating the semi-finished laminate object at 90° C. for 2 to 8 hours;
   then heat treating the semi-finished laminate object at 130° C. to 150° C. for 8 to 16 hours to provide a heat treated laminate object; and
   cooling the heat treated laminate object to obtain the composite laminate object.

2. The method according to claim 1, wherein the adhesive film comprises a thermoplastic film, a hotmelt thermoplastic film, or a film of thermosetting epoxy resin.

3. The method according to claim 1, wherein the extruded 7xxx Al member has a tubular shape.

4. The method according to claim 3, wherein the polypropylene resin does not comprise any of a silicone oil mold release agent, a wax mold release agent and a hydrocarbon oil mold release agent.

5. The method according to claim 1 wherein the extruded 7xxx Al member has an open structure.

6. The method according to claim 1 wherein the 7xxx Al substrate is not heat treated prior to the assembling and heating of the layered arrangement.

7. The method according to claim 1, wherein the pressure applied to at least a surface of the fiber reinforced polypropylene preform is from 50 to 200 psi.

8. The method according to claim 1, wherein the adhesive film comprises an epoxy resin.

9. The method according to claim 1, wherein the reinforcing fibers are selected from the group consisting of glass fibers, carbon fibers, aramid fibers and a combination thereof.

10. The method according to claim 1, wherein the polypropylene resin is chemically modified to comprise a silane functionality or an anhydride functionality.

11. The method according to claim 1, wherein the polypropylene resin comprises at least one of graphite particles and metal particles.

12. The method according to claim 1, wherein a thickness of the extruded 7xxx aluminum member is from 2 mm to 3 mm.

13. The method according to claim 1, wherein a thickness of the composite laminate object is from 2.8 to 6.2 mm.

14. The method according to claim 1, wherein after cooling the semi-finished laminate object to 90° C., the semi-finished laminate object is cooled to 20° C. to 30° C., and stored in inventory prior to the heat treatment at 90° C. for 2 to 8 hours and the heat treatment at 130° C. to 150° C. for 8 to 16 hours.

* * * * *